No. 754,349. PATENTED MAR. 8, 1904.
B. S. SCOTT.
FISH HOOK.
APPLICATION FILED JULY 21, 1903.
NO MODEL.
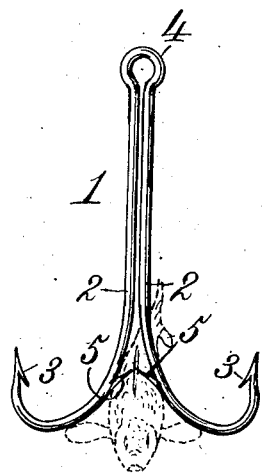
Witnesses.
Robert Everett,
James L. Norris.
Inventor
Benjamin S. Scott.
By James L. Norris.
Atty.

No. 754,349. Patented March 8, 1904.

UNITED STATES PATENT OFFICE.

BENJAMIN S. SCOTT, OF EWELL, VIRGINIA.

FISH-HOOK.

SPECIFICATION forming part of Letters Patent No. 754,349, dated March 8, 1904.

Application filed July 21, 1903. Serial No. 166,475. (No model.)

*To all whom it may concern:*

Be it known that I, BENJAMIN S. SCOTT, a citizen of the United States, residing at Ewell, in the county of James City and State of Virginia, have invented new and useful Improvements in Fish-Hooks, of which the following is a specification.

This invention relates to fish-hooks.

The object of the invention is in a thoroughly practical and positive manner to effect holding of live bait and its presentation in such manner as that it can be swallowed either head or tail first and while held will be free to swim or move, thus increasing the attractiveness of the bait, with the result of enlarged possibilities of securing the capture of fish.

As will hereinafter appear, the hook of this invention will securely hold a live bait, such as a minnow, in such manner as while inflicting the minimum of pain the bait will be permitted to swim or move about, and when so held the hooks will be so positioned that if a fish takes the bait it is sure to be caught. While peculiarly adapted for holding live bait, it is to be understood that the invention also contemplates the employment of cut bait or any kind of bait capable of attracting a fish.

With the above and other objects in view, as will appear as the nature of the invention is better understood, the same consists, generally stated, in a fish-hook having a plurality of barbed shanks and upward-disposed bait-holding prongs on the shanks.

The invention consists, further, in a fish-hook having a plurality of barbed shanks and upward-projecting oppositely-disposed bait-holding prongs on the shanks.

The invention consists, further, in a fish-hook having a plurality of barbed shanks disposed in substantial parallelism and upward-projecting oppositely-disposed bait-holding prongs arranged on the inner sides of the shanks.

The invention consists, further, in a fish-hook having a plurality of barbed shanks, the barbs being disposed in the same plane and the shanks being provided with upward-projecting oppositely-disposed bait-holding prongs projecting inward from the shanks.

The invention consists, finally, in the novel construction and combination of parts of a fish-hook embodying the functions described, as will be hereinafter fully described and claimed.

In the accompanying drawings, forming a part of this specification, and in which like characters of reference indicate corresponding parts, there is illustrated one form of embodiment of the invention capable of carrying the same into practical operation, it being understood that the elements therein exhibited may be varied or changed as to shape, proportion, and exact manner of assemblage without departing from the spirit thereof, and in this drawing the figure is a view in elevation of a fish-hook constructed in accordance with the present invention, a bait, in this instance the representation of a minnow, being shown as impaled on the bait-holding prongs of the shanks.

Referring to the drawing, 1 designates generally the hook, the same being formed of two shanks 2, terminating in the usual barbs 3, and formed at their crest or bend with an eye 4, to which the line is secured. As shown, the barbed or hook portions are shown as in the same plane—that is to say, instead of being arranged in parallelism, as is usual, they project outward from the shanks, thus presenting two distinct hooks, either of which will be effective in capturing the fish should it attempt to take the bait.

The salient feature of the present invention resides in the provision of a pair of bait-holding prongs 5, which are formed on the opposed faces of the shanks and project upward and practically meet, by which arrangement when a bait is impaled all danger of its accidental separation or release from the prongs will be positively obviated.

As shown, the hook is made of a single piece of metal, this for purposes of cheapness and readiness of production; but it will be understood that if preferred two hooks may be employed, the shanks of which may be secured at their upper ends in a suitable keeper, and as this will be readily understood detailed illustration thereof is deemed unnecessary.

In the use of the hook the shanks are sprung apart and the bait is inserted therebetween, and upon release of the shanks the prongs will penetrate the bait and hold it positively in position. Should the prongs be inserted through the back of the bait, if alive it will be free to have movement and can swim thus in a manner that will be readily apparent, causing attraction of the fish. Of course if preferred the prongs may be passed through the tail or mouth of the bait, as with hooks of the ordinary construction. Where cut bait is employed, the prongs will operate to hold it in position in a manner that will be perfectly apparent.

While the form of hook herein shown is one that has been found thoroughly efficient for the purposes designed, it is to be understood that the invention is not to be limited to the exact construction herein shown, and various modifications as to form and different proportions of parts may be adopted and still be within the scope of the invention.

Having thus described the invention, what I claim is—

1. A fish-hook having a plurality of barbed shanks, and upward-disposed bait-holding prongs on the shanks.

2. A fish-hook having a plurality of barbed shanks, and upward-projecting oppositely-disposed bait-holding prongs on the shanks.

3. A fish-hook having a plurality of barbed shanks disposed in substantial parallelism, and upward-projecting oppositely-disposed bait-holding prongs arranged on the inner sides of the shanks.

4. A fish-hook having a plurality of barbed shanks, the barbs being disposed in the same plane, and the shanks being provided with upward-projecting oppositely-disposed bait-holding prongs projecting inward from the shanks.

In testimony whereof I have hereunto set my hand in presence of two subscribing witnesses.

BENJAMIN S. SCOTT.

Witnesses:
  ANNIE GILLIAM,
  R. H. GILLIAM.